United States Patent
Foti (10) Patent No.: US 10,267,438 B2
(45) Date of Patent: Apr. 23, 2019

(54) FLEXIBLE CHIMNEY HOSE LINER

(71) Applicant: Hose Master, LLC, Cleveland, OH (US)

(72) Inventor: Sam J. Foti, Lyndhurst, OH (US)

(73) Assignee: Hose Master, LLC, Cleveland, OH (US)

( * ) Notice: Subject to any disclaimer, the term of this patent is extended or adjusted under 35 U.S.C. 154(b) by 0 days.

(21) Appl. No.: 15/964,907

(22) Filed: Apr. 27, 2018

(65) Prior Publication Data

US 2018/0245718 A1    Aug. 30, 2018

Related U.S. Application Data

(63) Continuation of application No. 14/729,535, filed on Jun. 3, 2015, now Pat. No. 9,982,811.

(Continued)

(51) Int. Cl.
*F16L 11/00* (2006.01)
*F16L 11/118* (2006.01)
(Continued)

(52) U.S. Cl.
CPC .............. *F16L 11/118* (2013.01); *F16L 11/20* (2013.01); *F23J 13/02* (2013.01); *F23J 13/025* (2013.01);
(Continued)

(58) Field of Classification Search
CPC ............ F16L 11/20; F16L 11/118; F23J 13/02
(Continued)

(56) References Cited

U.S. PATENT DOCUMENTS 1,270,579 A * 6/1918 Witzenmann ........... F16L 11/16
138/122
1,340,818 A   5/1920 Brinkman
(Continued)

FOREIGN PATENT DOCUMENTS

| AT | 8692 | 8/1902 |
| DE | 19701120 A1 | 7/1998 |
| FR | 2866376 | 8/2005 |

OTHER PUBLICATIONS

European Search Report dated Oct. 27, 2015, for corresponding European Patent Application No. 15275149. (8 pages).
(Continued)

*Primary Examiner* — James F Hook
(74) *Attorney, Agent, or Firm* — Tarolli, Sundheim, Covell & Tummino LLP; John A. Yirga, Esq.

(57) ABSTRACT

A flexible hose liner is provided having a cylindrical body extending along a longitudinal axis from a first end to a second end. First and second sleeves form the cylindrical body by separate continuous ribbons having a plurality of convolutions formed in a helical pattern along the cylindrical body from the first end to the second end. A ring is formed in each revolution about the longitudinal axis of the continuous ribbon of the first and second sleeves. A plurality of rings form the cylindrical body, each ring has a first convolution and an ending convolution such that a mechanical connection is formed between the ending convolution of a preceding ring and the first convolution of a succeeding ring. The mechanical connection of the between the rings of the first sleeve being different from the mechanical connection of the rings of the second sleeve.

20 Claims, 6 Drawing Sheets

Related U.S. Application Data (60) Provisional application No. 62/009,508, filed on Jun. 9, 2014.

(51) Int. Cl.
 *F16L 11/20* (2006.01)
 *F23J 13/02* (2006.01)

(52) U.S. Cl.
 CPC .... *F23J 2213/202* (2013.01); *F23J 2213/301* (2013.01); *F23J 2213/303* (2013.01); *F23J 2213/40* (2013.01); *Y10T 29/49844* (2015.01)

(58) Field of Classification Search
 USPC .......................... 138/122, 129, 134, 135, 149
 See application file for complete search history.

(56) References Cited

U.S. PATENT DOCUMENTS

| | | | |
|---|---|---|---|
| 3,473,575 A * | 10/1969 | Vogelsang | F16L 59/125 138/114 |
| 3,682,203 A * | 8/1972 | Foti | F16L 11/16 138/135 |
| 4,846,147 A | 7/1989 | Townsend et al. | |
| 5,004,018 A * | 4/1991 | Bainbridge | F01N 13/14 138/122 |
| 5,158,814 A * | 10/1992 | Foti | B21C 37/121 138/122 |
| 5,165,732 A | 11/1992 | Townsend | |
| 5,222,288 A | 6/1993 | Thomas | |
| 6,155,303 A * | 12/2000 | Krawietz | F01N 13/1816 138/121 |
| 6,418,971 B1 | 7/2002 | Foti et al. | |
| 6,561,228 B1 * | 5/2003 | Lennartsson | B21C 37/121 138/134 |
| 2008/0041482 A1 | 2/2008 | Baumhoff et al. | |
| 2008/0264510 A1 * | 10/2008 | Zepp | B21C 37/121 138/122 |
| 2012/0005984 A1 | 1/2012 | Meredith | |

OTHER PUBLICATIONS

European Examination Report dated Aug. 3, 2017, for corresponding European Patent Application No. 15275149. (7 pages).
Machine Translation of DE-19701120.

* cited by examiner

FLEXIBLE CHIMNEY HOSE LINER

CROSS REFERENCES TO RELATED APPLICATIONS

The present application is a continuation application under 35 U.S.C. § 120 of co-pending U.S. non-provisional application Ser. No. 14/729,535 filing date of Jun. 3, 2015 and that was published on Dec. 10, 2015 under publication number US-2015-0354733, which claims priority to U.S. provisional patent application Ser. No. 62/009,508 filed Jun. 9, 2014. This Application claims priority to and incorporates by reference the above applications and publication in their entireties for all purposes.

FIELD OF DISCLOSURE

The present disclosure relates to an insulated flexible chimney hose liner, and more specifically, a flexible chimney hose liner used to evacuate gases from a structure.

BACKGROUND

The use of chimney liner systems are typical for masonry and box chimneys, which facilitate the evacuation of fumes and gases from boilers, fireplaces, stoves, furnaces, hot water heaters, and the like from a given structure. Such structures include, but are not limited to, buildings, houses, and factories.

Conventional chimney liners are typically formed in linear sections by manufactures in lengths, for example of 50 foot sections and have a diameter on average of five (5") to twenty (20") inches. The linear sections are then coiled in five-to-six (5-6') foot diameters for compact shipping. Once received at a site for installation, the coils are manually straightened by the installers, which is a labor intensive process because the construction of the conventional liners are inflexible, holding most any shape in which the liner is positioned by the force of an automated coiler or manually by an operator.

Further discussion of conventional liners is found in U.S. Pat. No. 4,846,147 that issued on Jul. 11, 1989 and invented by Donald M. Townsend et al. U.S. Pat. No. 4,846,147 is incorporated herein by reference in its entirety.

SUMMARY

One aspect of the disclosure comprises a flexible hose liner having a cylindrical body extending along a longitudinal axis from a first end to a second end. First and second sleeves form the cylindrical body by separate continuous ribbons having a plurality of convolutions formed in a helical pattern along the cylindrical body from the first end to the second end. The first sleeve surrounds the second sleeve. A ring is funned in each revolution about the longitudinal axis of the continuous ribbon of the first and second sleeves. A plurality of rings form the cylindrical body, each ring has a first convolution and an ending convolution such that a mechanical connection is formed between the ending convolution of a preceding ring and the first convolution of a succeeding ring. The mechanical connection of the between the rings of the first sleeve are different from the mechanical connection of the rings of the second sleeve.

Another aspect of the present disclosure comprises a flexible hose liner having a cylindrical body extending along a longitudinal axis from a first end to a second end. The liner also includes substantially concentrical first and second sleeves forming the cylindrical body having a longitudinal axis centrally located therein, the first and second sleeves being formed by separate continuous ribbons having a plurality of convolutions formed in an angular helical pattern along the cylindrical body from the first end to the second end. The first sleeve substantially concentrically surrounds the second sleeve. A mechanical connection forms in the respective ribbons of the first and second sleeves on each revolution about the longitudinal axis, the mechanical connection in the ribbon of the first sleeve includes a different configuration than the configuration of the mechanical connection of the ribbon in the second sleeve to facilitate flexibility in the hose liner.

Yet another aspect of the present disclosure includes a method of making a flexible hose liner, the method comprising the steps of forming a cylindrical body extending along a longitudinal axis from a first end to a second end from first and second sleeves and forming the first and second sleeves by separate and continuous ribbons having a plurality of convolutions. The ribbons form the sleeves with a rotational angular helical pattern along a longitudinal axis of the cylindrical body from the first end to the second end. The method also includes the step of positioning a central core between the first and second sleeves and forming the central core from a continuous strip of fiber along a helical rotational angle and providing a mechanical connection in the respective ribbons of the first and second sleeves on each revolution about the longitudinal axis, the mechanical connection in the ribbon of the first sleeve being a different configuration than the mechanical connection of the ribbon in the second sleeve to facilitate flexibility in the hose liner.

BRIEF DESCRIPTION OF THE SEVERAL VIEWS OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures generally wherein like numbered features shown therein refer to like elements having similar characteristics and operational properties throughout unless otherwise noted. The present disclosure relates to a flexible chimney hose liner, and more specifically, a flexible chimney hose liner used to evacuate gases from a structure.

Figure 1:
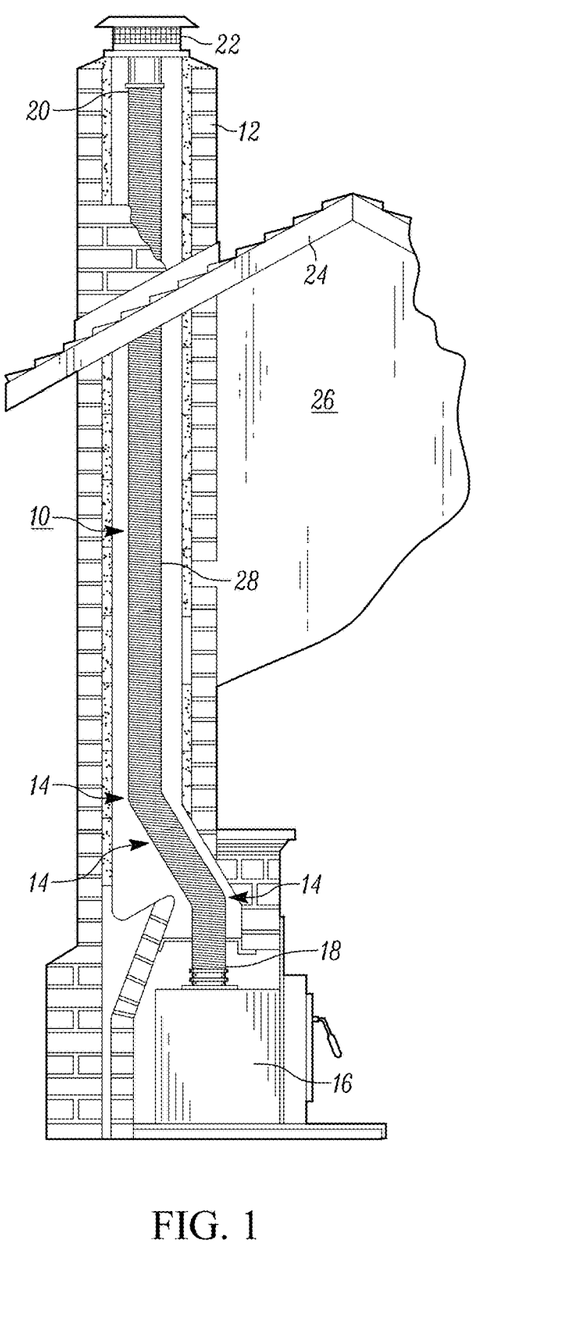
FIG. 1 is a side elevation view of a flexible chimney hose liner constructed in accordance with one example embodiment of the present disclosure installed in a sectioned-elevation view of a masonry chimney.

A flexible chimney hose liner 10 is illustrated in FIG. 1 positioned within a masonry chimney 12 during use. The hose liner 10 is constructed in such a way to allow for bends 14 to occur as needed dining installation. The hose liner 10 includes a first end 18 that during use couples to a heating device 16, such as a stove or boiler. The hose liner further comprises a second end 20 that during use couples to a chimney top 22, which typically extends beyond a roof 24 of a structure 26, such as a house, plant, factory, building, and the like.

Figure 2:
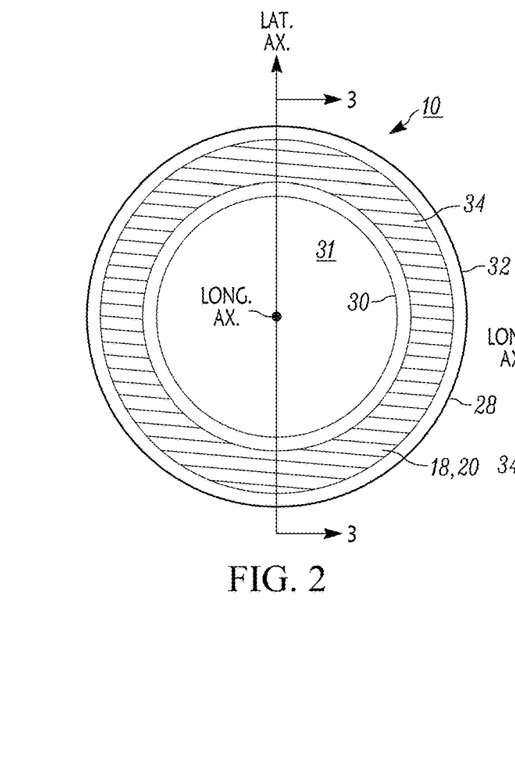
FIG. 2 is an end view of a flexible chimney hose liner constructed in accordance with one example embodiment of the present disclosure.

A body 28 extends along a longitudinal axis "LONG. AX." of the hose liner 10 from the first end 18 to the second end 20. Illustrated in FIG. 2 is an end view of either the first or second end 18, 20, respectively of the hose liner 10 constructed in accordance with one example embodiment of the present disclosure. The hose liner 10 in the illustrated example embodiment is annularly shaped about the longitudinal axis LONG. AX. and includes a lateral axis "LAT. AX." extending radially outward comprising an inner sleeve 30, an outer sleeve 32, separated by and in contact with a middle core 34, all of which are annularly constructed about the longitudinal axis LONG. AX. to form a central opening 31.

The inner and outer sleeves, 30, 32, respectively are formed by a thin flat ribbon "R" that is passed through forming dies and wound around a mandrel so that the ribbon R is arranged and attached between ribbon sections by a specific convolution connection 40. In the illustrated example embodiment, the inner and outer sleeves 30 and 32 are cylindrically shaped by the winding of the ribbon in a helix configuration with a plurality of convolution connections 40 between ribbon connection at each section or width of the ribbon R, illustrated by dimension W in FIG. 3. That is, each section of ribbon R include a plurality of convolutions C, and the last CL and first convolution Cl of each ribbon R section W are overlapped to form a joint J, so that the sleeves are continuously connected from the first 18 to second 20 along the body 28.

In the illustrated example embodiment, the ribbon R is a continuous metal strip for the entire length of the body 28, rolled in a helical pattern along the longitudinal axis, LONG. AX. The ribbon R can be of aluminum, steel, and other metals as would be appreciated by those of ordinary skill in the art. It is also within the contemplation of the present disclosure that the outer sleeve 32 is formed from a different metal than the inner sleeve 30.

Figure 4:
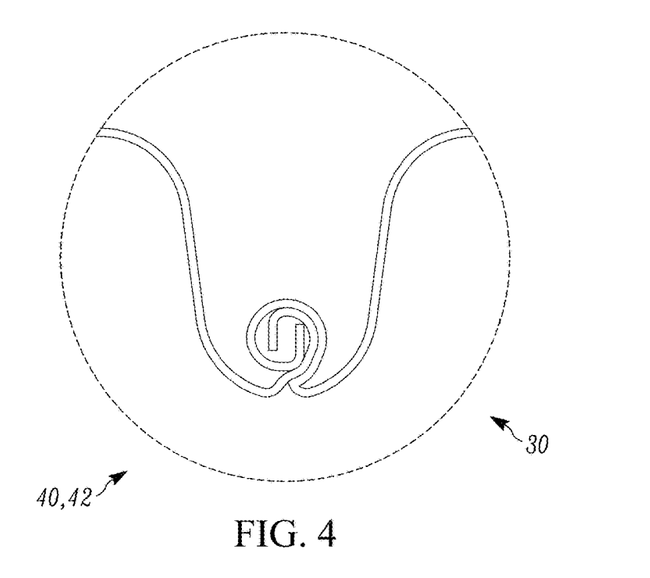
FIG. 4 is a magnified view of an inner coil convolution connection formed in accordance with one example embodiment of the present disclosure.

The overlapping first C1 and last CL convolutions in the inner sleeve 30 form an inner convolution connection 42 at ends of each ribbon strip R such that each 360° degree rotation of the ribbon about the body 28 is a connection that forms the inner width W of the ribbon. In the illustrated example embodiment, the inner convolution connection 42 is a helix connection as illustrated in the magnified view of FIG. 4.

The formation and details of the helix convolution connection 42 is further described in U.S. Pat. No. 6,418,971 to Foti that issued on Jul. 16, 2002 and assigned to the assignee of the present disclosure. The details of U.S. Pat. No. 6,418,971 are incorporated herein by reference in its entirety.

The overlapping first C1 and last CL convolutions in the outer sleeve 32 form an outer convolution connection 44 at ends of each ribbon strip R such that each 360° degree rotation of the ribbon about the body 28 is a connection that forms the outer width W of the ribbon. It should be appreciated that the overlapping convolution are connected to the same continuous strip of ribbon, only that it is successive revolutions along the longitudinal axis during formation of the ribbon that are interconnected. In the illustrated example embodiment, the inner and outer connections, 42 and 44, respectively are aligned so that the connections coincide with each other. However, it should be appreciated that this coinciding alignment need not occur since the inner and outer sleeves are formed independently in another example embodiment.

Figure 5:
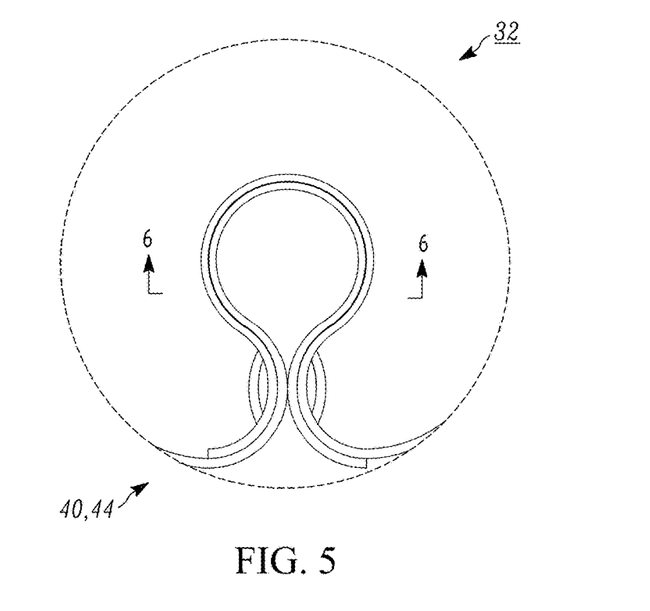
FIG. 5 is a magnified view of an outer coil convolution connection formed in accordance with one example embodiment of the present disclosure.
Figure 6:
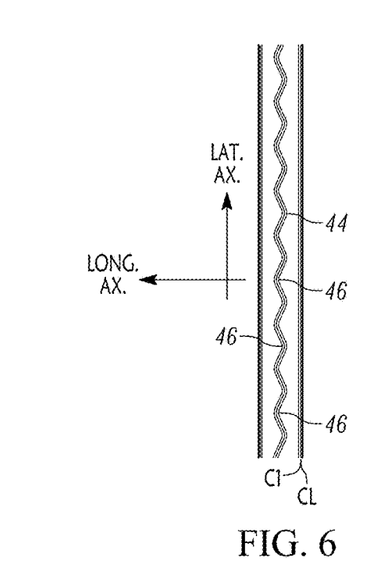
FIG. 6 is a section view of the outer coil convolution connection of the outer coil convolution connection formed in accordance with one example embodiment of the present disclosure.
Figure 7:
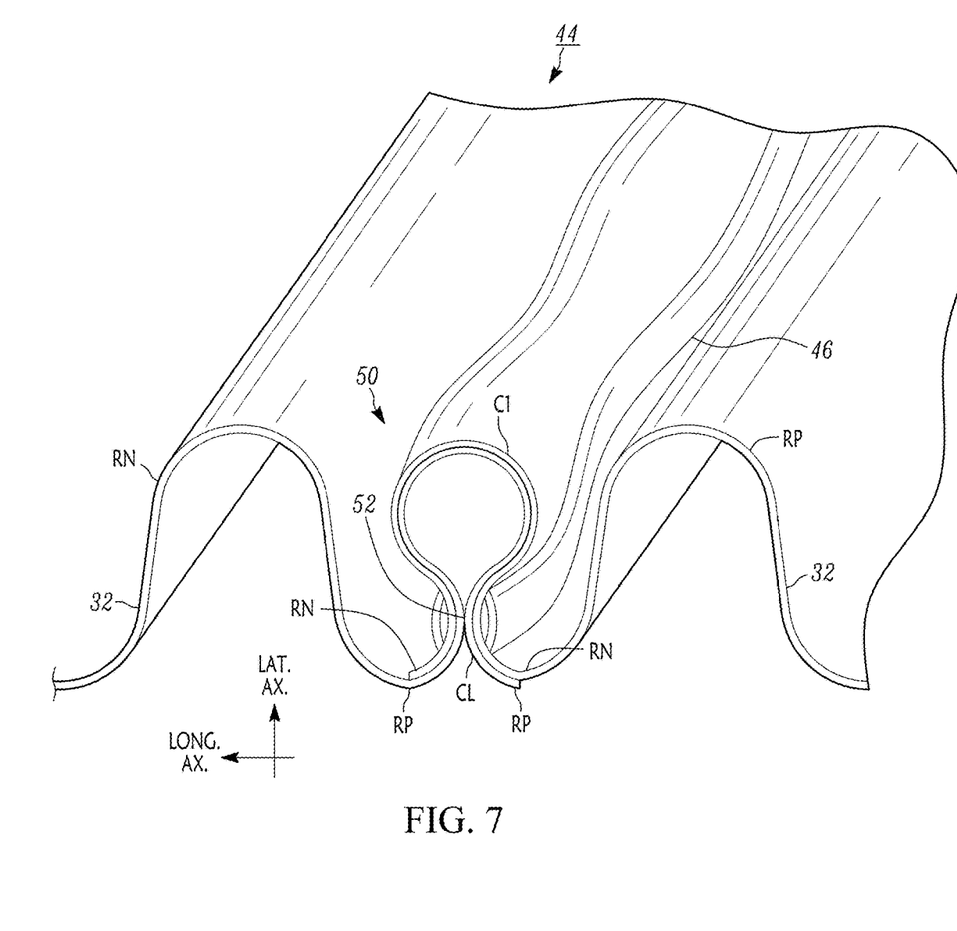
FIG. 7 is an isometric view of an outer sleeve convolution connection constructed in accordance with one example embodiment of the present disclosure.

In the illustrated example embodiment of FIGS. 5-7, the outer convolution connection 44 is an undulating crimp 50 connection that includes undulations shown along the section view of FIG. 6 and perspective view of FIG. 7. As C1 of the extended ribbon section RN is placed over the last convolution CL of the already positioned ribbon section RP, a crimping operation occurs for one revolution of the body 28. The crimping operation forms an annular undulating crimp 50, pushing the two convolution sections together until a contact point 52 is formed within the undulating crimp 50 throughout one entire revolution along the lateral axis. The crimp 50 is formed with the outer ribbon section RN positioned and crimped over the inner RP convolution CL with a series of inner connected undulations 46, as illustrated in the section view of FIG. 6 and the partial isometric view of FIG. 7.

Figure 3:
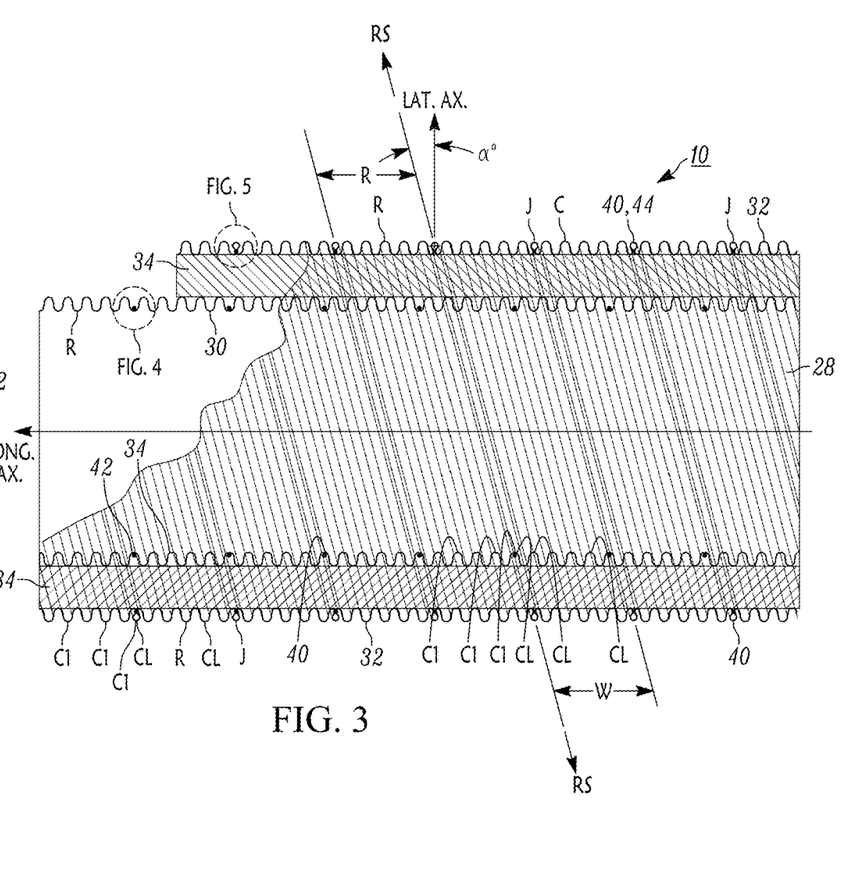
FIG. 3 is a side sectional elevation view of the flexible chimney hose liner of FIG. 2 along section lines 3-3.

In the illustrated example embodiment of FIGS. 2-3, the outer diameter of the hose liner 10 is approximately seven (7") inches and the inner diameter is approximately six (6") inches, while the width of each convoluted ribbon for the inner and outer sleeves is one and one quarter (1.25") inches, having approximately six (6) convolutions per width W. In one example embodiment, the inner sleeve 30 is made from stainless steel, while the outer sleeve 32 is made from aluminum in the example embodiment and rotated at a helical angle of approximately fifteen (15°) degrees (as indicated by angle α) about the lateral axis along the entire longitudinal axis of the body 28. A foil 45 surrounds the middle core 34 in the illustrated example embodiment and has the same width W as the width of the inner and outer ribbon sleeves W, and is applied at fifteen (15°) degrees (as indicated by angle α) about the lateral axis along the entire longitudinal axis of the body 28.

Figure 9:
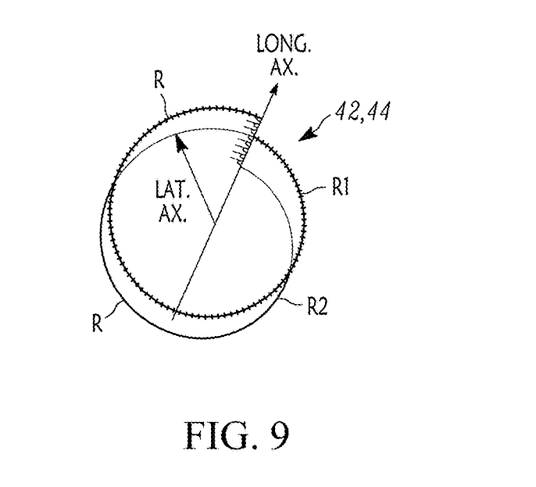
FIG. 9 is a continuous ribbon forming a plurality of rings of either an inner or outer sleeve of a flexible hose liner in accordance with one example embodiment of the present disclosure.

Illustrated in FIG. 9 a continuous ribbon R forming first R1 and second R2 rings of a plurality of rings making up the body 28 of the hose liner 10. Each ring R is spaced along a helical pattern such that at least one convolution overlaps between rings and is used to form a mechanical connection 42, 44. A ring R is formed in each 360° degree revolution about the longitudinal axis of the continuous ribbon of either the first 30 or second 32 sleeves.

A plurality of rings R1, R2, . . . RN form the cylindrical body 28 along the longitudinal axis. Each ring has a first convolution C1 and an ending convolution CL, such that a mechanical connection 42, 44 is formed between the last convolution CL of a preceding ring R1 wild the first convolution C1 of a succeeding ring R2.

Figure 8:
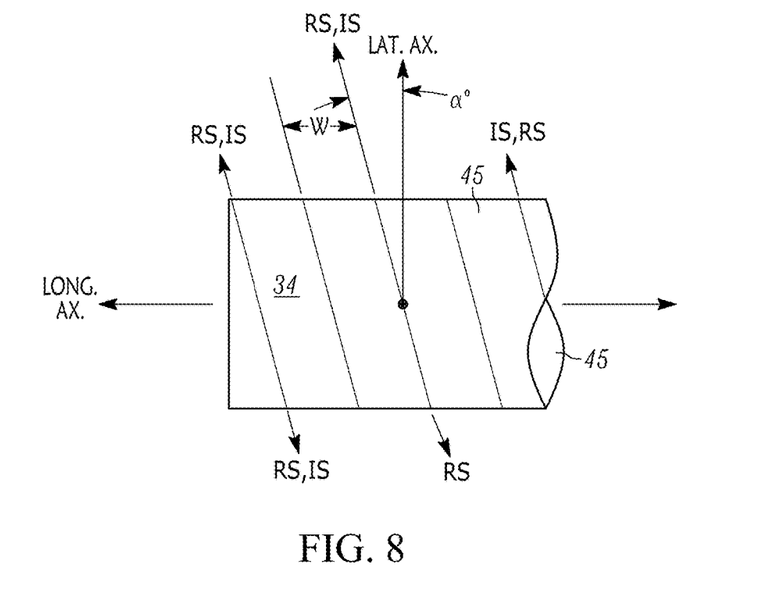
FIG. 8 is an elevation view of the middle core of the flexible chimney hose liner constructed in accordance with one example embodiment of the present disclosure.

Illustrated in FIG. 8 is the helical pattern of the middle liner 34 in accordance with one example embodiment of the present disclosure. The middle liner 34 is fiberous or polymeric material such as insulation that limits the transfer of heat and/or fumes from the hose liner 10, such as fiberglass, foam, or paper insulation, foil lined insulation, and the like. In the illustrated example embodiment of FIG. 3, the helical pattern of the inner sleeve 30, the outer sleeve 32, and middle liner 34 all coincide as to seams of the ribbon RS and the width seams IS (see FIGS. 3, 8, and 10) of the insulation of the middle liner 34. In yet another example embodiment, the middle liner 34 includes insulation bound by a wrap 45, such as a thin layer of aluminum foil on the inner or outer or both diameters as illustrated in FIGS. 8 and 10.

Figure 10:
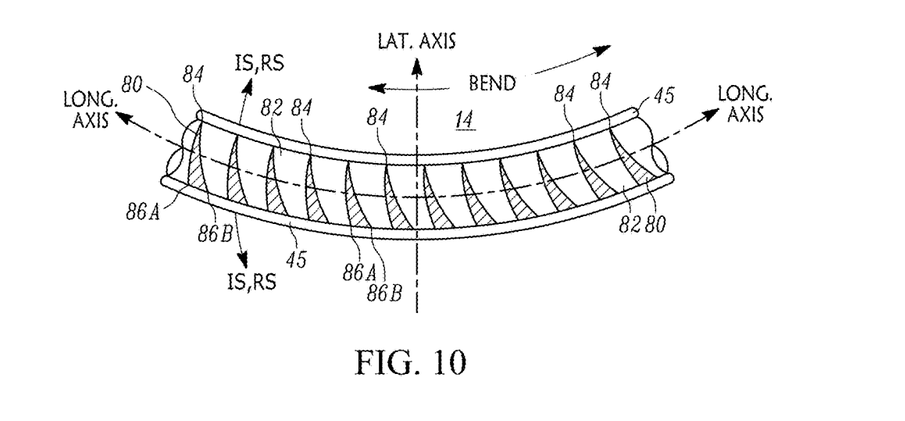
FIG. 10 is a perspective view of a middle core of the flexible hose liner illustrating its movement internally about a bend in accordance with one example embodiment of the present disclosure.

FIG. 10 is a perspective view of a middle core 34 of the flexible hose liner 10, illustrating the middle core's movement internally about a bend 14 in accordance with one example embodiment of the present disclosure. The middle core 34 as illustrated in FIGS. 8 and 10 includes the wrap 45 that includes supporting material such as foam or insulation that is cut along seams IS at the same helix angle as the ribbon seams RS to allow for flexible curving and relative movement about bends 14 in the inner and outer sleeves 30, 32, respectively and core 34. Stated another way, the core 34 including the wrap 45 is a long continuous piece of insulation and foil that is helically wound about the inner core 30 that is a single piece of core material, such as for example, foam or insulation that extends from the first end 18 to the second end 20 of the flexible chimney liner 10.

The middle core 34 as it is flexed about a bend 14 results is multiple triangular forms 80 about the core body 82 within the wrap 45, as illustrated in FIG. 10. The forms 80 are separations at the spiral helix that expands, creating expansion gaps 86 from 86A to 86B on the outer radius and compresses to a point 84 on the inner radius IR. The wrap or foil 45 and remains substantially constant at both the inner and outer radius, as shown in FIG. 10, while the core 34 and insulation opens or expands along the outer radius at 86.

Such construction in the core 34 allows the core to bend without permanent deformation and return to a linear shape by the inner and outer sleeves 30, 32, respectively. Advantageously, such construction does not require taping or a single linear seam along the length of the insulation that is often fractured and torn when bent in conventional chimney liners.

The construction of the hose liner 10 as described above and illustrated in the example embodiments of FIGS. 1-10 advantageously allow the flexible installation of the hose liner in a chimney to include bends 14 and further allows the liner to spring back to a linear shape without permanent deformation (such as a spring) because of the armor of the inner convolution connection 42, outer convolution connection 44, and spiral middle core 34 are moveably connected and are capable of moving both together and relative to each other. As well and unlike conventional hose liners, the flexible chimney hose liner 10 of the present disclosure can be coiled for shipping, removed from the shipping and the configuration of the outer convolution connection 44 in combination with the inner convolution connection 42 and spiral aligned middle insulation or middle core 34 allow the hose liner to become uncoiled to a linear hose liner from first 18 to second ends 20 without use of equipment or manual labor. Stated another way, the configuration of the hose liner 10 allows for the natural elongations and expansion from a coiled pack position to a linear straight position (similar in character to a spring that is coiled then released) once removed from a box or once the straps are cut holding the shipped coil.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a" "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically and not necessarily in contact. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features axe grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A flexible hose liner comprising:
a cylindrical body extending along a longitudinal axis from a first end to a second end;
first and second sleeves forming said cylindrical body, the first and second sleeves being formed by separate continuous ribbons having a plurality of convolutions formed in a helical pattern along said cylindrical body from said first end to said second end, the first sleeve surrounding said second sleeve;
a ring formed in each revolution about a longitudinal axis of said continuous ribbon of said first and second sleeves, wherein prior to forming a mechanical connection, the ring extends along a linear path comprising a linear revolution path, a plurality of rings forming said cylindrical body along said longitudinal axis, each ring having a first convolution and an ending convolution such that a mechanical connection is formed between the ending convolution of a preceding ring and the first convolution of a succeeding ring, wherein at least one of the mechanical connections of the first and second sleeve comprises an undulating crimp connection, wherein the undulating crimp connection comprises two convolution sections crimped together at a contact point that is formed within an undulating crimp of the undulating crimp connection throughout each revolution about said longitudinal axis, further wherein, the undulating crimp connection once formed deviates from the linear revolution path by between 25 degrees and 45 degrees away and towards the linear revolution path.

2. The flexible hose liner of claim 1 wherein said mechanical connection of said first sleeve comprises the undulating crimp connection.

3. The flexible hose liner of claim 1 further comprising a central core formed from a continuous strip of insulation at an angle and positioned between said first and second sleeves.

4. The flexible hose liner of claim 3 wherein said central core further comprises a flexible wrap applied to the continuous strip of insulation at said angle.

5. The flexible hose liner of claim 1 further comprising a central core formed from a continuous strip of insulation wound at a helical angle to form a central opening.

6. The flexible hose liner of claim 5 wherein said central core further comprises a flexible wrap applied to the continuous strip of insulation at said angle.

7. The flexible hose liner of claim 1 wherein said mechanical connection of the first sleeve between said rings formed by said ending convolution of a preceding ring and the first convolution of a succeeding ring comprises one of said ending convolution and said first convolution substantially symmetrically over lapping said other of said first convolution and said ending convolution.

8. The flexible hose liner of claim 7 wherein the undulating crimp connection along at least one revolution of at least one ring comprises an external portion of the two convolutions extending away from the longitudinal axis, wherein the contact point is between the longitudinal axis and the external portion.

9. The flexible hose liner of claim 8 further comprising a central core formed from a continuous strip of insulation at an angle and positioned between said first and second sleeves.

10. The flexible hose liner of claim 1 wherein the undulating crimp connection along at least one revolution of at least one ring comprises an external portion of the two convolutions extending away from the longitudinal axis, wherein the contact point is between the longitudinal axis and the external portion.

11. The flexible hose liner of claim 1 wherein the contact point undulates between 25 degrees and 45 degrees away from and towards linear revolution path while crossing the linear revolution path.

12. A flexible hose liner comprising:
a cylindrical body extending along a longitudinal axis from a first end to a second end;
substantially concentrical first and second sleeves forming said cylindrical body having a longitudinal axis centrally located therein, the first and second sleeves being formed by separate continuous ribbons having a plurality of convolutions formed in an angular helical pattern along said cylindrical body from said first end to said second end, the first sleeve substantially concentrically surrounding said second sleeve;
a mechanical connection is formed in the respective ribbons of the first and second sleeves on each revolution about said longitudinal axis, the mechanical connection in at least one of the ribbon of the first sleeve and the ribbon of the second sleeve comprises an undulating crimp connection, wherein the undulating crimp connection comprises two convolution sections crimped together at a contact point that is formed within an undulating crimp of the undulating crimp connection throughout each revolution about said longitudinal axis wherein, the undulating crimp connection once formed deviates from a path of the angular helical pattern in an undulating profile path.

13. The flexible hose liner of claim 12 wherein said mechanical connection in each respective ribbon further comprises a ring formed in each revolution about the longitudinal axis of said continuous ribbon forming said first and second sleeves, a plurality of rings forming said cylindrical body along said longitudinal axis, each ring comprises a first convolution and an ending convolution such that said mechanical connection is formed between the ending convolution of a preceding ring and the first convolution of a succeeding ring.

14. The flexible hose liner of claim 12 wherein said mechanical connection of said first sleeve comprises the undulating crimp connection.

15. The flexible hose liner of claim 12 further comprising a central core formed from a continuous strip of insulation at an angle and positioned between said first and second sleeves.

16. The flexible hose liner of claim 15 wherein said central core further comprises a flexible aluminum wrap located on at least one of an inner and an outer surface of the central core.

17. A method of making a flexible hose liner, the method comprising the steps of:
- forming a cylindrical body extending along a longitudinal axis from a first end to a second end from first and second sleeves;
- forming said first and second sleeves by separate and continuous ribbons having a plurality of convolutions, the ribbons forming said sleeves at a rotational angular helical pattern along a longitudinal axis of said cylindrical body from said first end to said second end,
- positioning a central core between said first and second sleeves and forming said central core from a continuous strip of fiber along a helical rotational angle; and
- providing a mechanical connection in the respective ribbons of the first and second sleeves on each revolution about said longitudinal axis, the mechanical connection in at least one of the ribbon of the first sleeve and the ribbon of the second sleeve comprises an undulating crimp connection, pushing two convolution sections of the at least one of first and second sleeves together until a contact point that undulates relative to a path of travel along the helical rotation angle, is formed within the undulating crimp throughout one entire revolution along the lateral axis.

18. The method of claim 17 further comprising the step of overlapping at least one convolution in each revolution of said ribbon forming said first sleeve.

19. The method of claim 18 further comprising the step of providing the undulating crimp connection along at least a portion of said overlapping section of said ribbon forming said first sleeve.

20. The method of claim 17 further comprising the step of providing the undulating crimp connection along at least a portion of said mechanical connection of said first sleeve.

* * * * *